US007821391B2

(12) United States Patent
Gupta et al.

(10) Patent No.: US 7,821,391 B2
(45) Date of Patent: Oct. 26, 2010

(54) RFID TRACKER AND LOCATOR

(75) Inventors: Vikram Makam Gupta, Cary, NC (US);
Srinivas Annambhotla, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 543 days.

(21) Appl. No.: 11/865,374

(22) Filed: Oct. 1, 2007

(65) Prior Publication Data

US 2009/0085745 A1   Apr. 2, 2009

(51) Int. Cl.
*G08B 1/08* (2006.01)
(52) U.S. Cl. .............................. 340/539.13; 340/572.1
(58) Field of Classification Search ............ 340/539.11, 340/0.13, 539.16, 0.2, 572.1, 10.1
See application file for complete search history.

(56) References Cited

U.S. PATENT DOCUMENTS

2007/0124077 A1   5/2007   Hedlund

FOREIGN PATENT DOCUMENTS

WO          02/44865          6/2002

OTHER PUBLICATIONS

International Search Report, corresponding to International Patent Application No. PCT/US2008/061972, dated Aug. 12, 2008.
Written Opinion, corresponding to International Patent Application No. PCT/US2008/061972, dated Aug. 12, 2008.
International Preliminary Report on Patentability, corresponding to International Patent Application No. PCT/US2008/061972, dated Sep. 8, 2009.

*Primary Examiner*—Jeffery Hofsass
(74) *Attorney, Agent, or Firm*—R. Brian Drozd; Moore & Van Allen PLLC

(57) ABSTRACT

A radio frequency identification (RFID) tracking device, that includes a global positioning satellite (GPS) interface and an RFID interface. The RFID interface is capable of communicating with an RFID tag on an RFID item and reading the RFID. The device is capable of detecting the RFID item, obtaining a GPS location via the GPS interface, and associating the GPS location with the RFID and the RFID item and storing the associated GPS location with the RFID item.

20 Claims, 5 Drawing Sheets

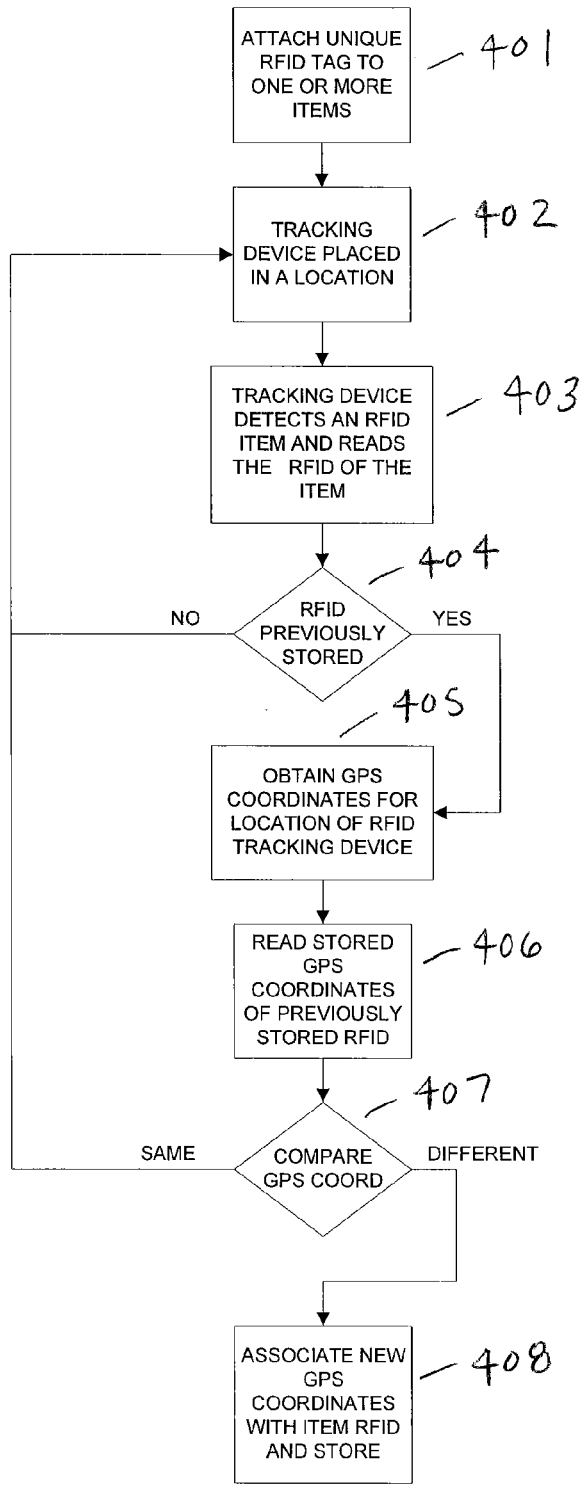

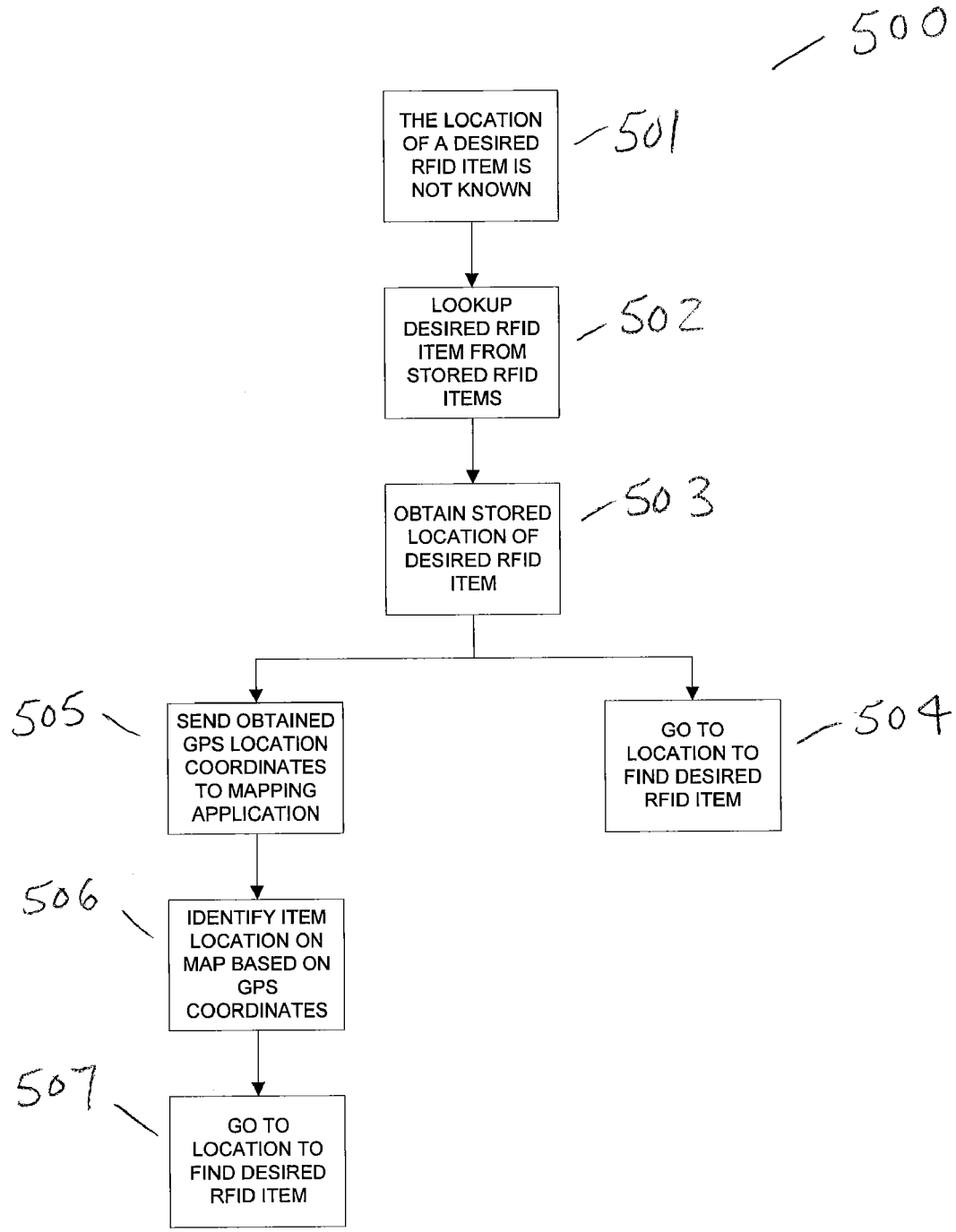

RFID TRACKER AND LOCATOR

BACKGROUND OF THE INVENTION

The present invention is related to radio frequency identification (RFID) tagged items, and more specifically to an RFID tracker and locator.

Everyone at one time or another has misplaced an item and must spend time searching various locations in order to find the item. For example, people have misplaced their wallet, forgotten where they left their car keys, cannot find that favorite book of theirs, as well as misplaced more important items like passports, certificates, checkbooks, etc. When an item is misplaced, people tend to panic and embark on a frantic search in an attempt to find the item. Once misplaced, a person has nothing to help them in locating the item.

BRIEF SUMMARY OF THE INVENTION

Embodiments of the present invention are related to a tracking device that includes a global positioning satellite (GPS) interface and an RFID interface, the RFID interface being capable of communicating with an RFID tag on an RFID item and reading the RFID, wherein the tracking device is capable of detecting the RFID item, obtaining a GPS location via the GPS interface, and associating the GPS location with the RFID and the RFID item.

Embodiments of the present invention are further related to a method for tracking an item that includes detecting an item containing an RFID, obtaining GPS coordinates for a location in a vicinity of the item, associating the GPS coordinates with the item, and storing the associated GPS coordinates with the RFID of the item.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 4 is a flowchart of a process for tracking an RFID item according to another example embodiment of the present invention; and FIG. 5 is a flowchart of a process for tracking an RFID item according to a still further example embodiment of the present invention.

DETAILED DESCRIPTION OF THE INVENTION

Figure 1:
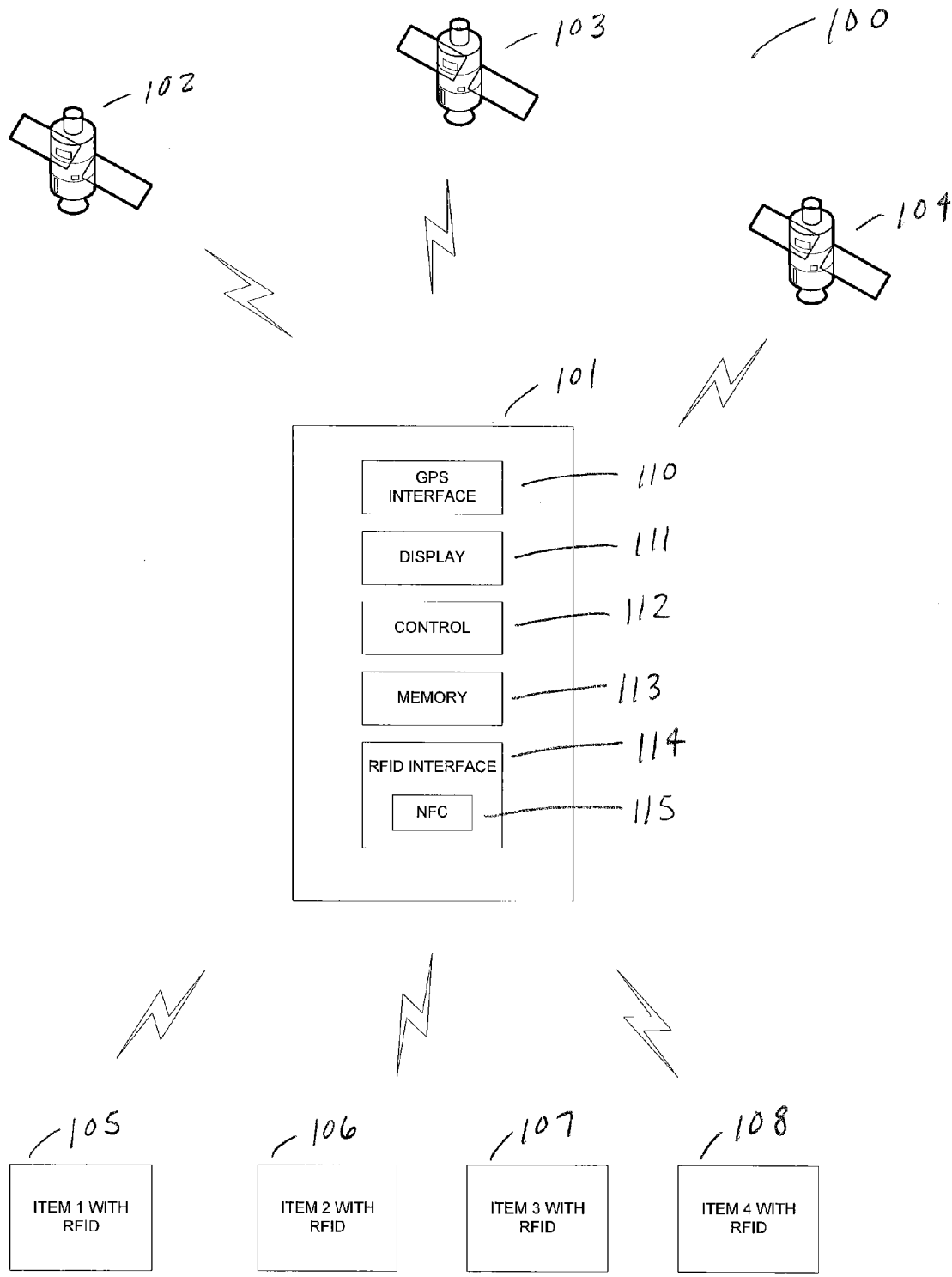
FIG. 1 is a diagram of a system including a RFID tracking and locating device according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention relate to a tracking device that may include a global positioning satellite (GPS) interface and a radio frequency identification (RFID) interface that allows tracking and locating of one or more items containing an RFID or RFID tag. An RFID tag may be active, passive, or semi-passive, and many do not require a battery or power source. A passive RFID tag may merely allow reading of information contained in the RFID tag, whereas in contrast, an active RFID tag may have the capability to actively transmit and/or provide interactive information. A GPS location (i.e., set of coordinates) is associated with an RFID tag on each of the items allowing location and tracking of these items.

To illustrate embodiments of the present invention, Near Field Communications (NFC) will be used identify and communicate with RFID tags on items. An RFID can be placed on any type of item. NFC is a short range wireless technology that allows devices to communicate over a short distance. The NFC function may transmit an electromagnetic field that is detected by an RFID tag and causes the RFID tag to respond. NFC is just one example of short range radio technology that may be used to detect and communicate with an RFID tag. However, embodiments of the present invention are not limited to the use of NFC technology or short range wireless technology for communicating with RFID tags as any wireless communication technology capable of communicating with an RFID is within the scope of the present invention.

According to embodiments of the present invention, a user may attach RFID tags to items that are of importance or to any other items that the user desires to track. A GPS location in the form of GPS coordinates within a vicinity of the item may be obtained. The GPS location is associated with the RFID and both stored. Therefore, if a user has misplaced an item, which has been tagged with an RFID, and cannot locate the item, the user merely retrieves the stored GPS location associated with the RFID of the item to help the user locate the item. To aid the user further, a user may enter a description for the item where the description is also stored with the GPS location and the RFID of the item. The RFID interface may continually ping for RFIDs on items or the user of the tracking device may initiate a one-shot communication with the RFIDs. The tracking device may automatically obtain GPS coordinates for found RFID items. Alternatively, in embodiments of the present invention, a user of the tracking device may initiate the obtaining of the GPS coordinates via the GPS interface.

For example, if a user has already tagged an item with an RFID (hereafter referred to as an RFID item) and desires to store and track this item, the user may merely place the tracking device in proximity to the RFID item and may push a "record" key on the tracking device to initiate a communication between a NFC communicator in the tracking device and the RFID of the item. Once there has been a successful communication, the tracking device may request the current location (i.e., GPS coordinates) for the tracking device from the GPS application of the tracking device. The tracking device may obtain the GPS location from one or more GPS satellites via the GPS interface of the tracking device. The tracking device may then record this location, a description of the RFID item (if entered by the user), and the RFID in a memory or database of the tracking device. Thus, in the future the user needs only to retrieve the information stored in the database to locate the RFID item if the location of the RFID item has been forgotten.

Moreover, according to embodiments of the present invention, a tracking device may continually monitor for items with RFID tags and automatically update stored information based on a current location of the item. This may occur if a current GPS location of the item is determined to be different than a stored GPS location of the item. For example, a user may move the tracking device to a particular location. The tracking device may constantly poll for RFID tags on items and communicate with these RFID tags when detected. If the tracking device detects and communicates with an RFID tag of an item, the tracking device may determine if this RFID is stored and if so, obtain the stored GPS location. The tracking device may then obtain a GPS location (GPS coordinates) for the location of the tracking device and compare this location with the stored location for the item. If the locations are different, the tracking device may update the GPS location for the item automatically with the currently obtained GPS location. If the user has misplaced this item, the user again may merely retrieve the stored information for the item from the database of the tracking device where the tracking device may have stored a "last seen" location based on a previous detection of the RFID when the tracking device had been moved to a vicinity of the RFID item and updated automatically the location of the item.

In addition, according to embodiments of the present invention, the user may enter a distance value that represents a radius from a currently stored GPS location for an item. Therefore, when attempting to locate an item, the user may be given a location that includes the GPS location plus the defined radial distance. This allows an item to be associated with a location in a larger area (e.g., a room, a building, etc.) that may include more than one set of GPS coordinates. Also, the tracking device may determine all other GPS coordinates within the defined radius of the GPS coordinates. The GPS coordinates and the other GPS coordinates may be associated with the RFID and item and stored.

Further, according to embodiments of the present invention, tracking and locating of an RFID item may be helped by the user initially location training the tracking device. For example, GPS location coordinates may be mapped to a location description such as "kitchen," "master bedroom," "Makam's house," "Srinivas' office," etc. This provides a location description of a location of an RFID item making it very easy to find the RFID item if misplaced. This location description may also be entered by the user after obtaining the GPS coordinates for the RFID item, and the location description, the GPS coordinates, an item description, and the RFID all stored in a database of the tracking device.

Moreover, according to embodiments of the present invention, the tracking device may send the GPS coordinates to a mapping application where the mapping device provides a map illustrating a location associated with the GPS coordinates. The tracking device may display this map on a display of the tracking device via a graphical user interface (GUI) such that a user may visually view a location of an item as illustrated on the map provided by the mapping application. This mapping application may be any type of mapping application that has the capability of mapping GPS coordinates on a map, for example, Wikimapia. The mapping application may be accessed remotely such as across a network (e.g., the Internet) or may reside on the tracking device itself.

FIG. 1 shows a diagram of a system including a RFID tracking and locating device according to an example embodiment of the present invention. The system 100 may include a tracking device 101, one or more GPS satellites 102-104, and one or more items with different RFID tags 105-108. The tracking device 101 may include a GPS interface 110 for communicating with the one or more GPS satellites 102-104 and obtaining GPS coordinates, a display 111 that may include a graphical user interface (GUI) to provide information to and allow input from a user of the tracking device 101, control logic 112 for controlling various functions of the tracking device 101, a memory 113 allowing storage of information (such as a database containing item RFIDs and associated GPS locations), and an RFID interface 114 for communicating with the one or more RFID tags on the RFID items 105-108. The RFID interface 114 may communicate with the one or more RFID tags on the RFID items 105-108 via short range communication using a Near Field Communicator interface 115. According to embodiments of the present invention, the tracking device 101 may store in a database in the memory 113 RFID tag information associated with items 105-108, as well as a description of the item 105-108, and an associated GPS location that includes GPS coordinates for a vicinity that the item 105-108 is located. The tracking device 101 may also store a description of a location associated with the GPS location.

Figure 2:
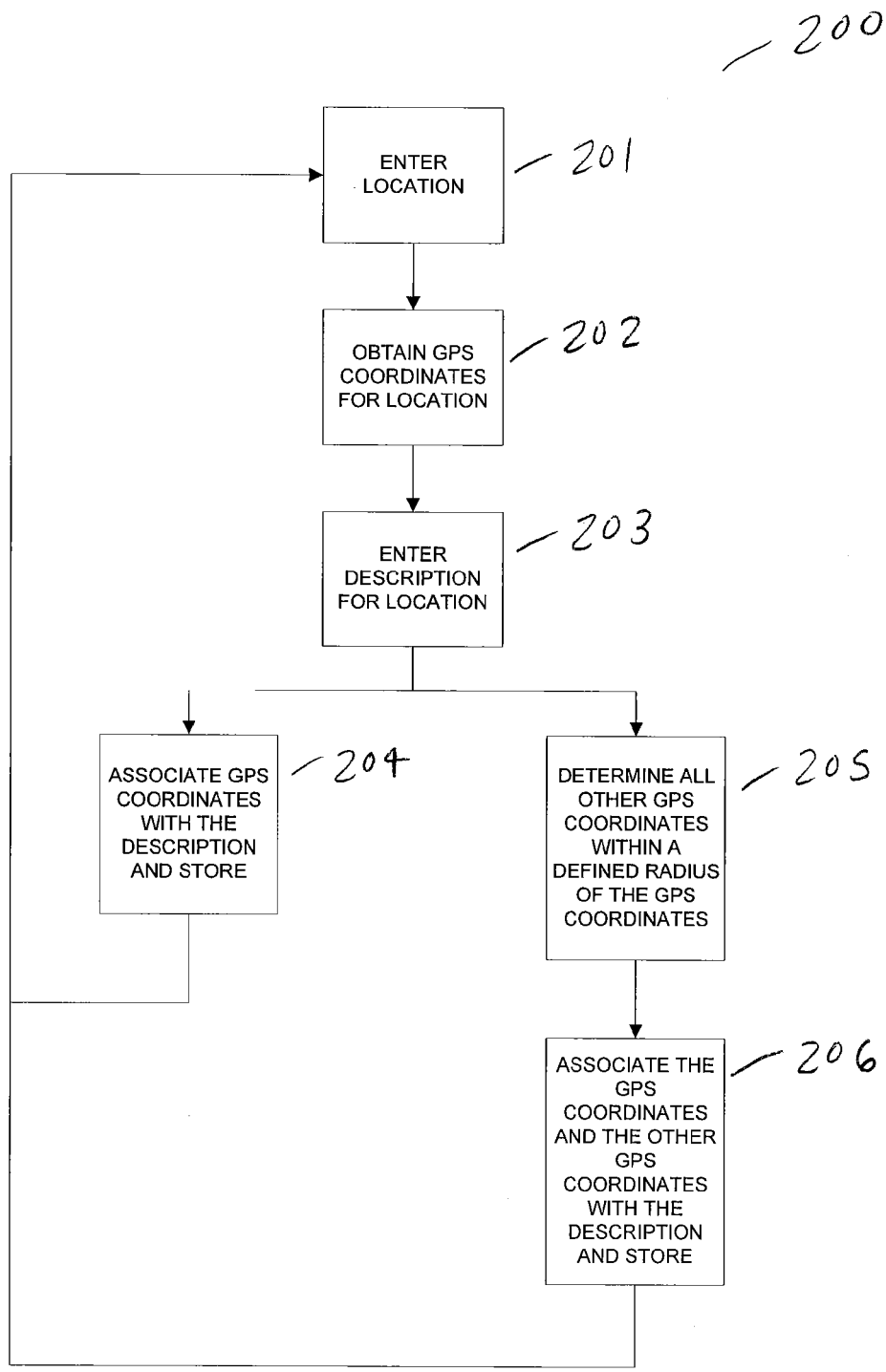
FIG. 2 is a flowchart of a training process for locating an RFID item according to an example embodiment of the present invention.

FIG. 2 shows a flowchart of a training process for locating an RFID item according to an example embodiment of the present invention. In the process 200 in block 201, a user may travel to a location with a tracking device. In block 202, the user may use the tracking device to obtain GPS coordinates for the location. In block 203, a description for the location may be entered. In block 204, the GPS coordinates may be associated with the description for the location and this information stored. The process may then return to block 201 where a user may travel to another location with the tracking device. Further, from block 203, in block 205, the tracking device may determine all other GPS coordinates within a defined radius of the GPS coordinates. In block 206, the GPS coordinates and the other GPS coordinates may be associated with the description and stored. The process may then return to block 201 where a user may travel to another location with the tracking device. Using the defined radius may be useful when a user wants to enter a description of a larger area such as a house, garage, etc. and associate this description with the RFID and the item.

Figure 3:
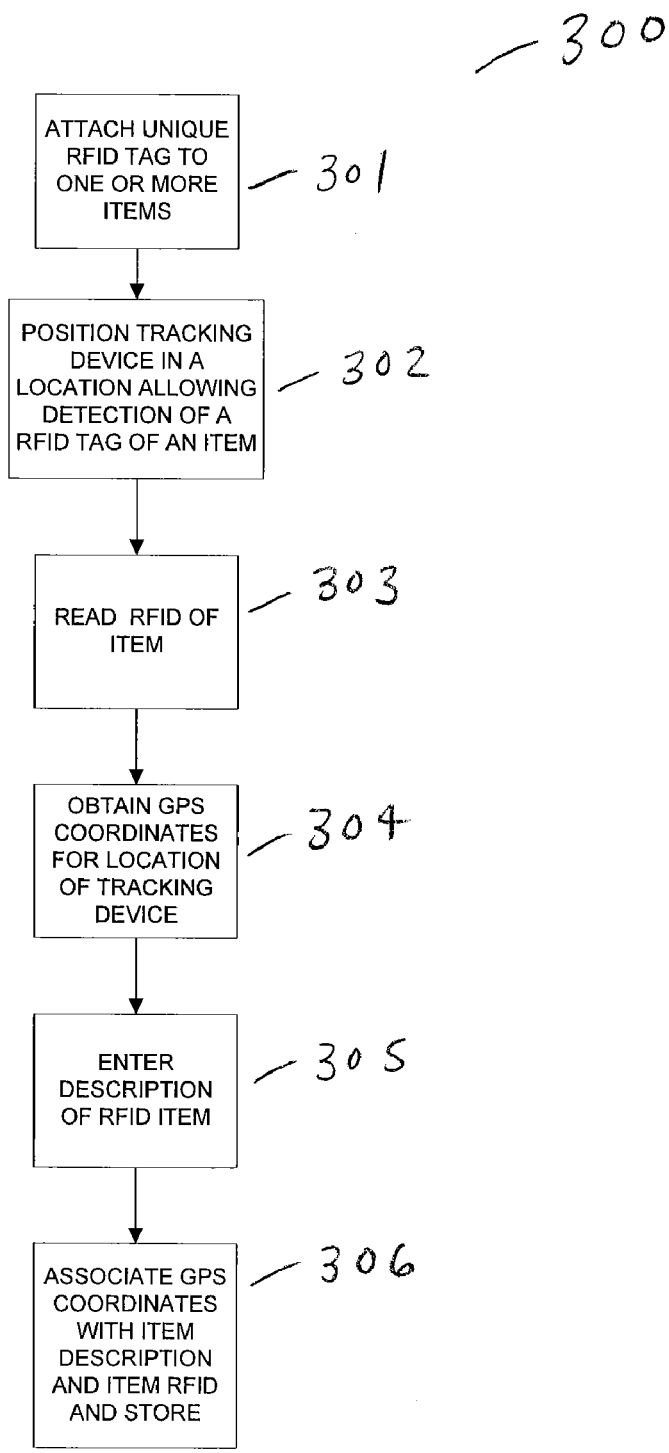
FIG. 3 is a flowchart of a process for tracking an RFID item according to an example embodiment of the present invention.

FIG. 3 shows a flowchart of a process for tracking an RFID item according to an example embodiment of the present invention. In the process 300, in block 301, a unique RFID tag may be attached to one or more items (RFID item). In block 302, a tracking device may be positioned in a location allowing detection of an RFID tag of an item. In block 303, the tracking device may communicate with the RFID tag and read the RFID of the item. In block 304, GPS coordinates may be obtained for a location of the tracking device. In block 305, a description of the item may be entered (if not already entered). In block 306, the GPS coordinates may be associated with the item description and the RFID and this information stored.

FIG. 4 shows a flowchart of a process for tracking an RFID item according to another example embodiment of the present invention. In the process 400 in block 401, a unique RFID tag may be attached to one or more items. In block 402, a tracking device may be moved to a location. In block 403, the tracking device may continually ping for RFID tags and detect an RFID tag on an RFID item and read the RFID of the item. In block 404, the tracking device may determine if the RFID has been previously stored, and if not, the process may return to block 402. If the RFID has been previously stored, in block 405, GPS coordinates may be obtained for a location of the tracking device. In block 406, the previously stored GPS coordinates for the RFID may be read. In block 407, the previously stored GPS coordinates may be compared with the currently obtained GPS coordinates, and if they are the same, the process may return to block 402. If the GPS coordinates are different, then in block 408, the new GPS coordinates may be associated with the RFID and this information is stored. Therefore, according to embodiments of the present invention, if a tracking device is placed within the vicinity of an item with an RFID tag that was previously stored, the tracking device may automatically update a location of the item if the GPS location has changed from that previously stored.

FIG. 5 shows a flowchart of a process for tracking an RFID item according to a still further example embodiment of the present invention. In the process 500, in block 501, the location of a desired RFID tagged item (RFID item) may not be known. In block 502, a desired RFID item may be looked up from stored RFID items. In block 503, a stored location of the desired RFID item may be obtained from the stored RFID items. In block 504, a user may go to the stored location obtained to find the desired RFID item. Alternatively, in block 505, GPS location coordinates obtained (i.e., stored location) may be sent to a mapping application. In block 506, an item location may be identified on a map based on the GPS coordinates. In block 507, a user may view a location of the item on the map using a GUI of a display and go to the location to find the desired RFID item.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A tracking device comprising:
   a global positioning satellite (GPS) interface; and
   an RFID interface, the RFID interface being capable of communicating with an RFID tag on an RFID item and reading the RFID;
   a graphical user interface (GUI) configured for:
     obtaining a series of GPS coordinates to custom-define an area; and
     receiving a description for the area;
   a control interface configured for:
     associating the series of GPS coordinates with the description for the area;
     periodically detecting the RFID item,
     obtaining a GPS location of the RFID item via the GPS interface in response to the RFID item being detected, and
     associating the GPS location with the RFID item and the area of the RFID item to indicate to a user the location of the RFID item relative to the area.

2. The device according to claim 1, further comprising a memory, the device storing the associated GPS location and the RFID in the memory.

3. The device according to claim 2, further comprising a display, the display presenting a graphical user interface (GUI) to a user of the device, the GUI allowing the user to read the stored GPS location for the RFID item to locate the RFID item.

4. The device according to claim 3, wherein the GUI provides the user the ability to send the stored GPS location to a map application, the map application associating the GPS location with a position on a map, the user locating the RFID item from viewing the position on the map.

5. The device according to claim 1, wherein the device comprises a mobile phone.

6. The device according to claim 1, further comprising a display, the display presenting a graphical user interface (GUI) to a user of the device, the GUI allowing the user to perform at least one of initiate obtaining GPS coordinates for a location of the device, enter a description for the RFID item, enter a description for the location of the device, associate the GPS coordinates with the description for the RFID item, associate the GPS coordinates with the description for the location of the device, store the associated GPS coordinates with the RFID item description, or store the associated GPS coordinates with the description for the location of the device.

7. The device according to claim 6, further comprising the GUI allowing the user to define a radius distance, initiate determining all other GPS coordinates within the defined radius distance from the GPS coordinates, and associate and store the GPS coordinates and the other GPS coordinates with the description for the location.

8. The device according to claim 1, the RFID interface further comprising a Near Field Communications (NFC) communicator, the NFC communicator communicating with the RFID tag on the RFID item and reading the RFID.

9. The device according to claim 1, wherein the device:
   continuously monitors for RFID items with RFID tags within a vicinity of the device;
   communicates with each detected RFID tag on each RFID item to read each RFID;
   determines if each detected RFID is stored in the device;
   obtains a current GPS location for the device if any of the RFID items have a stored RFID;
   compares the current GPS location with GPS locations stored for each RFID; and
   stores the current GPS location for each stored RFID if the current GPS location is different than the stored GPS location.

10. A method for tracking an item comprising:
    obtaining a series of GPS locations to custom-define an area;
    receiving a description for the area;
    associating the series of GPS locations with the description for the area;
    periodically detecting an item containing an RFID;
    obtaining GPS coordinates for a location in a vicinity of the item response to the item being detected;
    associating the GPS coordinates with the item and the area of the item to indicate to a user the location of the RFID item relative to the area; and
    storing the associated GPS coordinates with the RFID of the item.

11. The method according to claim 10, further comprising creating a description for the item and storing the associated GPS coordinates with the RFID and the description of the item.

12. The method according to claim 10, further comprising reading the stored GPS coordinates for the item to locate the item.

13. The method according to claim 10, further comprising obtaining at least one set of GPS coordinates for a location, generating a description for the location, and associating and storing the at least one set of GPS coordinates with the description for the location.

14. The method according to claim 13, further comprising reading the stored description for the location to locate the item.

15. The method according to claim 10, further comprising determining all other GPS coordinates within a defined radius of the GPS coordinates and associating and storing the GPS coordinates and the other GPS coordinates with the description for the location.

16. The method according to claim 15, further comprising reading the stored description for the location to locate the item.

17. The method according to claim 10, further comprising sending the GPS coordinates to a map application, the map application associating the GPS coordinates with a position on a map, and locating the item from viewing the position on the map.

18. An apparatus comprising a storage medium with instructions stored therein, the instructions when executed causing a processing device to perform a method, the method comprising:
    obtaining a series of GPS locations to custom-define an area;
    receiving a description for the area;
    associating the series of GPS locations with the description for the area;
    periodically detecting an item containing an RFID;
    obtaining GPS coordinates for a location in a vicinity of the item response to the item being detected;

associating the GPS coordinates with the item and the area of the item to indicate to a user the location of the RFID item relative to the area; and storing the associated GPS coordinates with the RFID of the item.

19. The apparatus method according to claim 18, wherein the method further comprises obtaining at least one set of GPS coordinates for a location, generating a description for the location, and associating and storing the at least one set of GPS coordinates with the description for the location.

20. The apparatus method according to claim 18, wherein the method further comprises determining all other GPS coordinates within a defined radius of the GPS coordinates and associating and storing the GPS coordinates and the other GPS coordinates with the description for the location.

* * * * *